(12) United States Patent
Hilton (10) Patent No.: US 12,370,889 B2
(45) Date of Patent: Jul. 29, 2025

(54) SENSOR ARRAY SYSTEM FOR A MOTORIZED BOARD

(71) Applicant: Gregory L. Hilton, New York, NY (US)

(72) Inventor: Gregory L. Hilton, New York, NY (US)

( * ) Notice: Subject to any disclaimer, the term of this patent is extended or adjusted under 35 U.S.C. 154(b) by 374 days.

(21) Appl. No.: 18/159,074

(22) Filed: Jan. 24, 2023

(65) Prior Publication Data

US 2024/0375509 A1    Nov. 14, 2024

(51) Int. Cl.
*B60K 26/02* (2006.01)
*B62K 1/00* (2006.01)

(52) U.S. Cl.
CPC .............. *B60K 26/02* (2013.01); *B62K 1/00* (2013.01)

(58) Field of Classification Search
CPC .......... B60K 26/02; A63C 17/08; A63C 17/12
See application file for complete search history.

(56) References Cited

U.S. PATENT DOCUMENTS

| | | | |
|---|---|---|---|
| 6,050,357 A | 4/2000 | Staelin et al. | |
| 7,138,774 B2 | 11/2006 | Negoro et al. | |
| 8,490,723 B2 | 7/2013 | Heinzmann et al. | |
| 9,101,817 B2 * | 8/2015 | Doerksen | G01P 15/18 |
| 9,211,470 B2 * | 12/2015 | Bigler | B62J 50/22 |
| 9,452,345 B2 * | 9/2016 | Doerksen | A63C 17/01 |
| 9,707,470 B2 * | 7/2017 | Ma | B62K 11/007 |
| 9,908,580 B2 * | 3/2018 | Doerksen | B62J 45/41 |
| 9,999,827 B2 * | 6/2018 | Wood | A63C 17/12 |
| 10,040,503 B2 * | 8/2018 | Chen | B62K 11/007 |
| 10,058,765 B2 * | 8/2018 | Ma | A63C 17/004 |
| 10,144,478 B2 | 12/2018 | Ying et al. | |
| 10,293,243 B1 * | 5/2019 | Doerksen | A63C 17/12 |
| 10,369,453 B2 * | 8/2019 | Bigler | B60L 50/52 |
| 10,399,457 B2 * | 9/2019 | Doerksen | B60L 50/50 |
| 10,456,658 B1 * | 10/2019 | Doerksen | G01C 19/42 |
| 10,583,886 B2 * | 3/2020 | Li | B62K 23/08 |
| 10,661,153 B2 * | 5/2020 | Ma | B62K 15/006 |
| 10,717,490 B1 | 7/2020 | Orehek | |
| 10,786,726 B2 * | 9/2020 | Doerksen | B60L 3/0007 |
| 10,800,477 B2 * | 10/2020 | Shang | B62K 11/02 |
| 10,926,159 B1 * | 2/2021 | Smith | A63C 17/013 |
| 11,273,364 B1 * | 3/2022 | Doerksen | A63C 17/12 |
| 11,299,059 B1 * | 4/2022 | De La Rua | A63C 17/016 |
| 11,325,021 B1 * | 5/2022 | McCosker | A63C 17/12 |
| 11,590,409 B2 * | 2/2023 | Doerksen | A63C 17/016 |
| 11,717,742 B2 * | 8/2023 | Turner | A63C 17/12 280/727 |
| 11,890,528 B1 * | 2/2024 | Doerksen | A63C 17/0046 |
| 12,005,340 B2 * | 6/2024 | Doerksen | A63C 17/0046 |

(Continued)

*Primary Examiner* — Jeffrey J Restifo
(74) *Attorney, Agent, or Firm* — LaMorte & Associates PC (57) ABSTRACT

A system and method of replacing a worn foot sensor array on a motorized board with a new sensor array. The new sensor array has a laminate structure with multiple sensor fields. An open area is disposed in the laminate structure along a midline. A central slot and diagonal slots extend from the first edge to the open area. Parallel slots extend from the diagonal slots. The slots separate multiple sensor fields. The multiple sensor fields are only interconnected by narrow lead fields. This enables the various sensor fields to move independently and rest against uneven surfaces without buckling, bending, or otherwise stressing the sensors on the sensor fields.

19 Claims, 6 Drawing Sheets

(56) References Cited

U.S. PATENT DOCUMENTS

| | | | |
|---|---|---|---|
| 12,187,373 B1* | 1/2025 | De La Rua | A63C 17/262 |
| 12,246,245 B1* | 3/2025 | Silva | A63C 17/08 |
| 2004/0055796 A1 | 3/2004 | Kamen et al. | |
| 2024/0375509 A1* | 11/2024 | Hilton | B60K 26/02 |

* cited by examiner

FIG. 6

SENSOR ARRAY SYSTEM FOR A MOTORIZED BOARD

BACKGROUND OF THE INVENTION

1. Field of the Invention

In general, the present invention relates to the structure and design of motorized boards, such as skateboards, wheel boards, hover boards, scooters, water foil boards, motorized paddleboards, and skyboards. More particularly, the present invention relates to the structure of the foot sensor arrays used on such motorized boards to activate and deactivate the motorized boards and/or to detect the present of a person standing on such a motorized board.

2. Prior Art Description

Due to recent improvements in small motor design and rechargeable batteries, strong motors have been added to many devices that have previously been manually operated. This is especially true in the area of personal transportation. Electric bicycles, electric scooters, and electric skateboards are now popular consumer products. The improved technology has also given rise to new products such as wheel boards, water foil boards, sky boards and hover boards. Two of the most popular types of motorized boards are the wheel board and hover boards. Wheel boards are personal transportation devices that contain a single wheel in the center of the device. A person rides a wheel board by placing his/her feet on platforms that extend from opposite sides of the central wheel. Hover boards are personal transportation devices where a person stands on a platform that extends between two parallel wheels. On most wheel boards and hover boards, the operation of the device is controlled by the feet that rest on the device. By shifting the rider's weight with the feet, the device can be caused to move in different directions and to stop. The shifting of weight and the changing of foot position are detected by sensors. Sensor arrays are located on the surfaces of the motorized boards upon which the feet rest. The feedback from these sensors controls the operations of the motorized board. Such prior art motorized boards are exemplified by U.S. Pat. No. 10,786,726 to Doerksen.

The sensors used to control the operation of a motorized board are also used for safety. Many motorized boards automatically stop if the sensors detect that no person is standing upon the motorized board. This prevents the motorized board from rolling away should a person step off the motorized board. The sensors also prevent the motorized board from starting prematurely as a person is stepping onto the motorized board.

Since the sensors are present on the surfaces of the motorized boards that are contacted by the feet, these surfaces wear over time and the sensors can become damaged. Damaged sensors can prevent the motorized board from working or can prevent the safety protocols from activating. As a result, the potential for injuries increases. Although the sensors on a motorized board wear, these sensors are not typically designed to be replaced. Although some aftermarket replacement parts with sensors can be found in the marketplace, these parts require extensive disassembly and reassembly of the motorized board.

Worn motorized boards, however, rarely have smooth, flat surfaces. Rather, the foot contact surfaces are often concave or contoured to make it less likely that a foot would inadvertently slip off the surface. If sensor arrays designed for a flat surface are applied to a concave surface, either the sensor arrays buckle or the sensor arrays have areas that are stressed. Buckled areas quickly wear and break. Stressed areas send false contact signals to the motor controller. Both conditions can cause the motorized board to malfunction and/or become dangerous to use.

A need therefore exists for sensor array system that can be retroactively added to the foot contact surfaces of a motorized board, wherein the sensor array system can conform to uneven, contoured surfaces without buckling or being stressed in a manner that causes false signals. This need is met by the present invention as described and claimed below.

SUMMARY OF THE INVENTION

The present invention is a system and method of replacing a worn foot sensor array on a motorized board. A new sensor array is provided that is made from a laminate structure. The laminate structure has a first edge and multiple sensor fields, wherein the multiple sensor fields are disposed symmetrically about a midline. An open area is disposed in the laminate structure along said midline. A central slot extends from the first edge to the open area. Diagonal slots extend from the open area to the first edge. Parallel slots extend from the diagonal slots, wherein said parallel slots are perpendicular to the first edge.

The open area, central slot, diagonal slots, and parallel slots partially separate multiple sensor fields. The multiple sensor fields are only interconnected by narrow lead fields. This enables the various sensor fields to move independently and rest against concave, convex or other contoured surfaces surfaces without buckling, bending, or otherwise stressing the sensors on the sensor fields.

The worn foot sensor array on the motorized board is removed to expose a support surface. The new sensor array is adhered to the support surface and electrically interconnected to the motorized board. If the support surface is uneven, worn or concave, the various sensor fields can adhere to the surface without producing any false signals that would interfere in the operation of the motorized board.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention sensor array system can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered a limitation when interpreting the scope of the appended claims.

Figure 1:
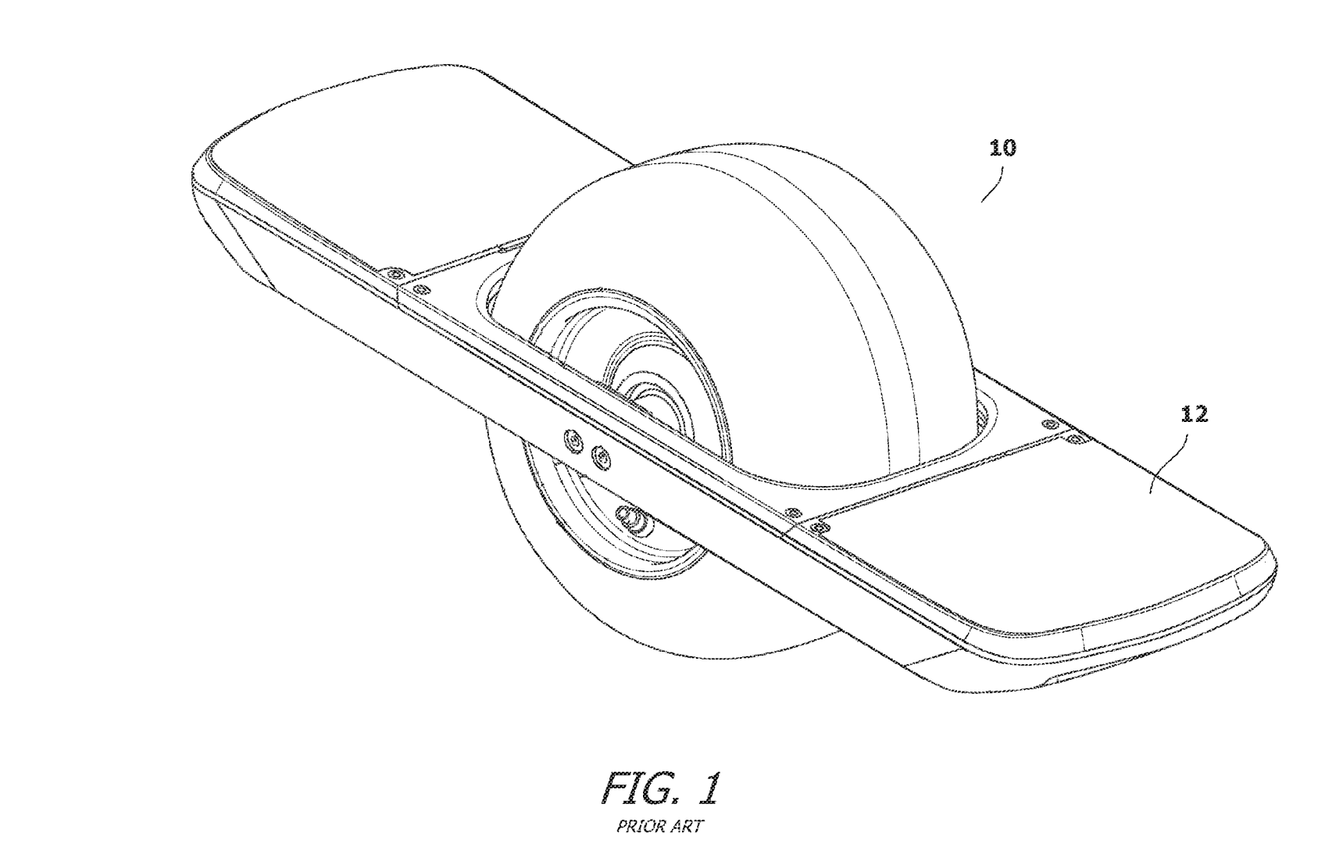
FIG. 1 shows a prior art prior art motorized board.
Figure 2:
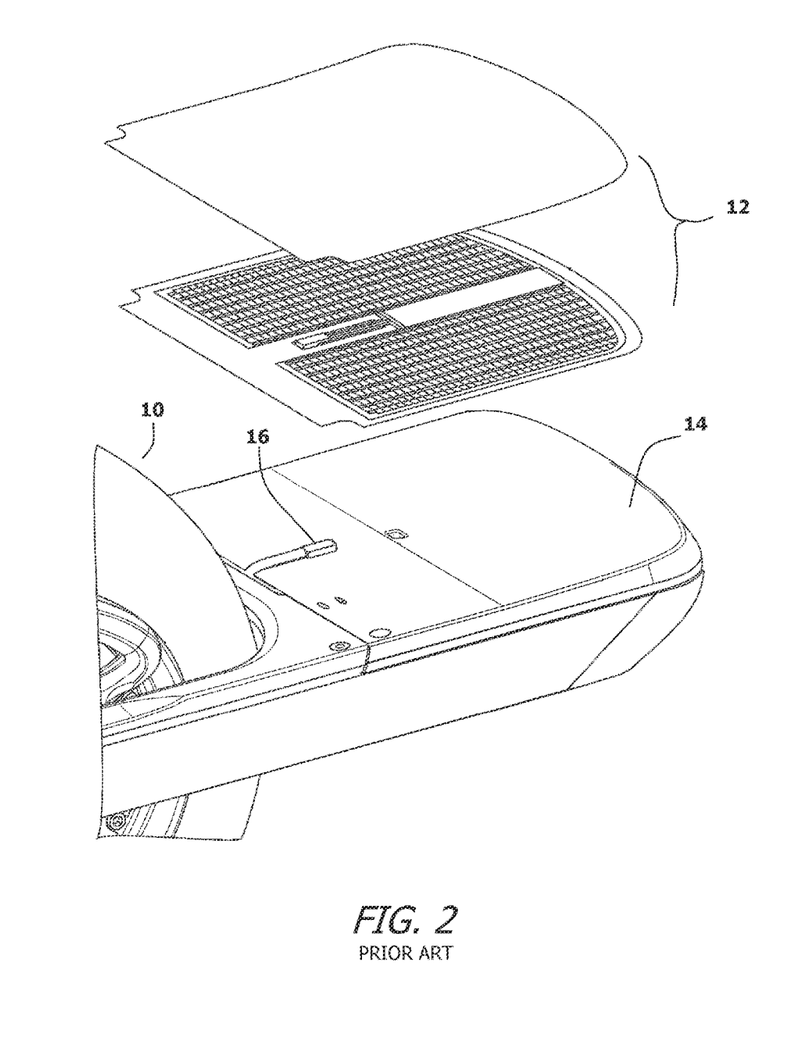
FIG. 2 is an exploded view of a foot pad on the prior art motorized board of FIG. 1.

Referring to FIG. 1 and FIG. 2, a motorized board 10 is shown having a worn foot contact surface 12. Although the motorized board 10 is shown as a wheel board, it is intended to be exemplary of any and all motorized boards, such as hover boards, motorized skateboards, motorized scooters and the like. The foot contact surface 12 contains various internal sensors that are used to activate, deactivate and otherwise control the motorized board 10.

Referring to FIG. 2, in conjunction with FIG. 1, it can be seen that the worn foot contact surface 12 is removed. Depending upon the model of the motorized board 10, the worn foot contact surface 12 can be either disassembled from the motorized board 10 or peeled/abraded away. Once the worn foot contact surface 12 is removed, the underlying support surface 14 is exposed. The underlying support surface 14 is most likely uneven and/or contoured. Furthermore, once the worn foot contact surface 12 is removed, the wire leads 16 connected to the sensors within the worn foot contact surface 12 are left exposed.

Figure 3:
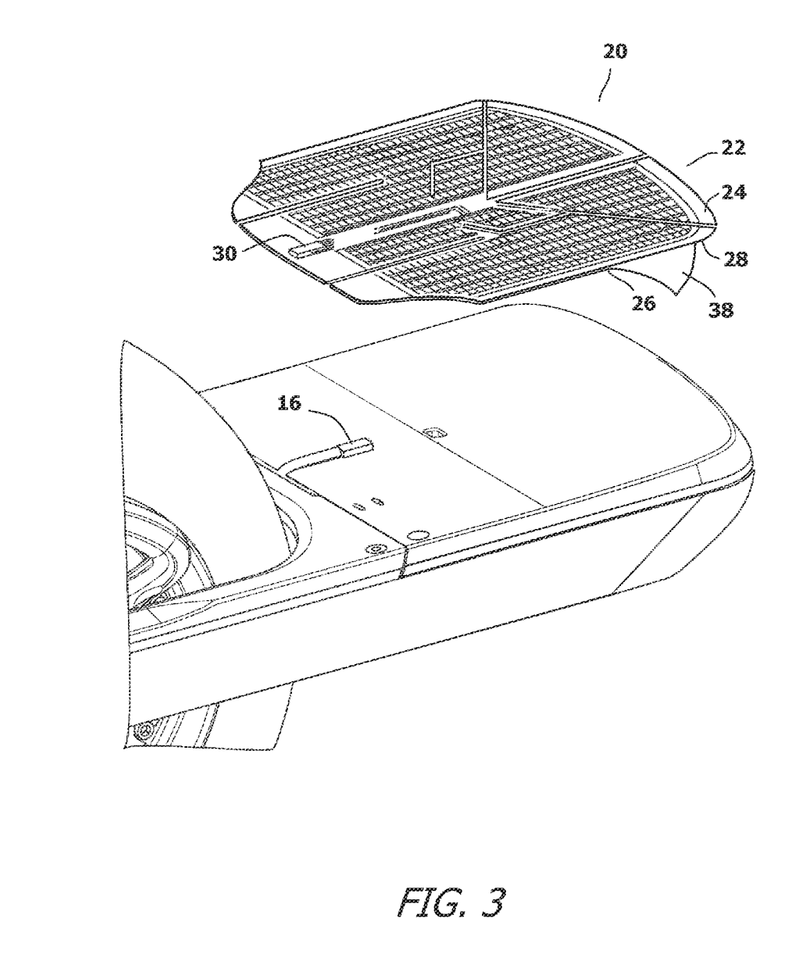
FIG. 3 shows an exemplary embodiment of a replacement sensor array system shown in conjunction with the support surface of a motorized board.
Figure 4:
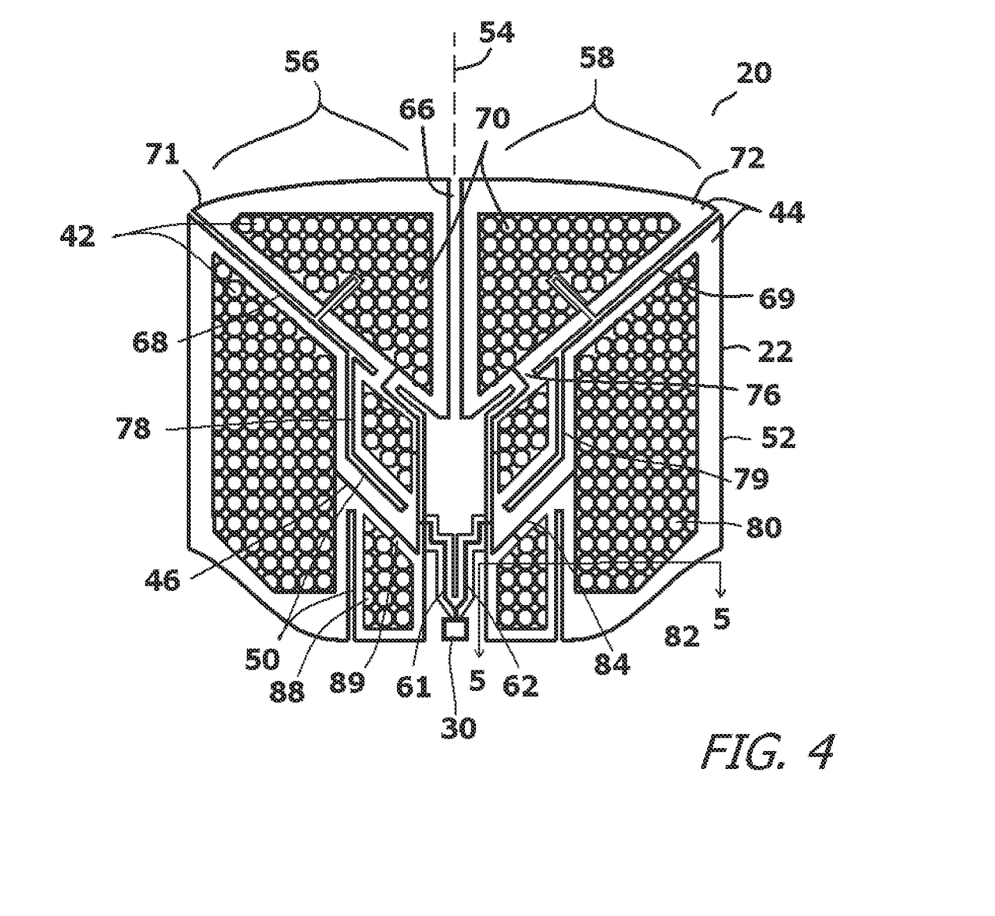
FIG. 4 is a top view of the sensor array system shown in FIG. 3.
Figure 5:
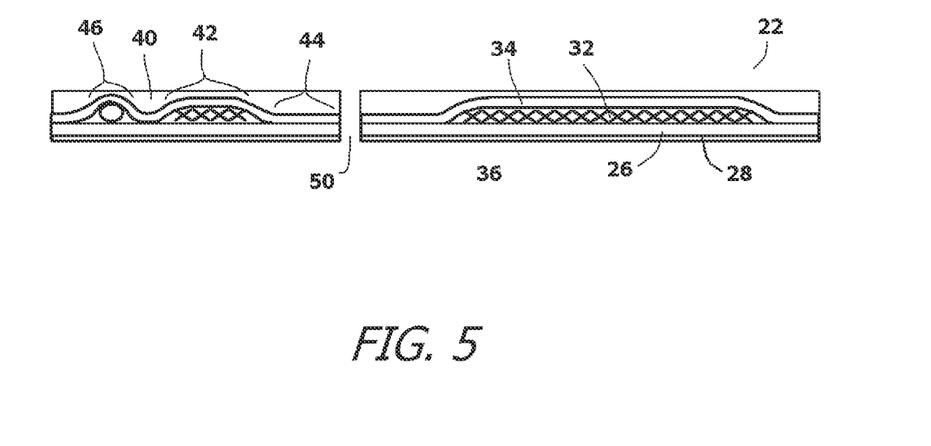
FIG. 5 shows a cross section of the sensor array system viewed along section line 3-3 from FIG. 4.

Referring to FIG. 3, FIG. 4 and FIG. 5, the present invention sensor array system 20 is shown. The sensor array system 20 includes a laminate construct 22. The laminate construct 22 has a top surface 24 and a bottom surface 26. Adhesive 28 is applied to the bottom surface 26 that enables the sensor array system 20 to adhere to the underlying support surface 14. The sensor array system 20 is flexible and contains a connector 30 that can interconnect with the existing wire leads 16.

The sensor array system 20 has strain gauges 32 encapsulated within its structure. The strain gauges 32 are encapsulated between a first sheet 34 and a second sheet 36. In the preferred embodiment, the first sheet 34 and the second sheet 36 are preferably sheets of polyethylene terephthalate, however other flexible polymer sheets can be used. The second sheet 36 has the bottom surface 26 that is coated in the adhesive 28. The adhesive 28 is temporarily covered in a peel away protective layer 38. An optional wear layer 40 can be adhered to the top of the first sheet 34. The wear layer 40 can be a wear resistant material such as a sheet of synthetic flashspun high-density polyethylene fibers. The wear layer 40 can also be textured or coated to provide a non-slip surface.

As will be explained, the strain gauges 32 are encapsulated in only certain areas of the laminate construct 22. The laminate construct 22 has sensor fields 42 where strain gauges are present, neutral fields 44 where there are no strain gauges present, and lead fields 46 where flexible leads 48 electrically interconnect to the strain gauges 32 in the sensor fields 42. In the neutral fields 44, the first sheet 34 can be directly bonded to the second sheet 36. A complex geometry of slots 50 are made through the neutral fields 44. The slots 50 do not expose the strain gauges 32 nor the flexible leads 48 to the external environment. Rather, the slots 50 merely separate sections of the laminate construct 22 without compromising the encapsulation of the strain gauges 32 in the sensor fields 42 and the flexible leads 48 in the lead fields 46.

The periphery 52 of the laminate construct 22 is shaped to mimic the shape of the worn foot contact surface 12 that it is replacing. In the shown embodiment, the shape is for a wheel board 10 such as that shown in FIG. 3. Regardless of peripheral shape, the laminate construct 22 has a mirrored construction about a midline 54. The midline 54 divides the laminate construct 22 into a first section 56 and a mirrored second section 58. The connector 30 is disposed along the midline 54. The connector 30 attaches to the wire leads 16 of the motorized board 10 and conducts signals to and from the various strain gauges 32. The connector 30 has split leads 61, 62 that extend toward the first section 56 and the second section 58 of the laminate construct 22, respectively. Other than the presence of the connector 30, the midline 54 of the laminate construct 22 extends along a central open area 64 and a central slot 66. None of the sensor fields 42 transit the midline 54. In this manner, the laminate construct 22 can be deformed along the midline 54 without applying stress to any of the sensor fields 42. Other than the presence of the split leads 61, 62 and the connector 30, most of the laminate construct 22 along the midline 54 is open. This enables the laminate construct 22 to be widened to the needs of the application. The first section 56 and a mirrored second section 58 can be extended away from the midline 54 to widen the footprint of the laminate construct 22. The stresses caused by the widening act primarily upon the split leads 61, 62 by causing the split leads 61, 62 to diverge away from the midline 54. This deformation does not cause any false signals or folds.

Two diagonal slots 68, 69 extend from the central open area 64 to the top corners 71, 72 of the laminate construct 22. This creates two triangular sensor fields 70. Each of the triangular sensor fields 70 is surrounded by a neutral field border 74. Each of the triangular sensor fields 70 is only connected to the remainder of the laminate construct 22 by a single lead field 76. The lead field 76 readily bends. In this manner, each triangular sensor field 70 can be attached to a surface that is not in the shared plane with the remainder of the laminate construct 22 without applying any significant stresses to the triangular sensor fields 70.

Slots 78, 79 parallel to the central slot 66 extend to the diagonal slots 68, 69. This creates outer sensor fields 80 below the triangular sensor fields 70. Each of the outer sensor fields 80 is surrounded by a neutral field border 82. Each of the outer sensor fields 80 is only connected to the remainder of the laminate construct 22 by a single lead field 84. In this manner, each outer sensor field 80 can be attached to a surface that is not in the plane shared with any of the other sensor fields 42 without applying stresses to any of the other sensor fields 42.

Two small sensor fields 86, 88 are interposed between the central open area 64 and each outer sensor field 80. Being closest to the midline 54 of the laminate construct, the small sensor fields 86, 88 are likely to experience the most bending stresses. The degree of bending stress can be reduced using sensor fields with small areas. The two small sensor fields 86, 88 include a lower sensor field 86 and an upper sensor field 88. The upper sensor field 88 is connected to the single lead field 87 that connects to the triangular sensor field 70. The lower sensor field 88 is connected to the single lead field 89. The simple lead field 89 readily bend without producing any adverse effects.

Figure 6:
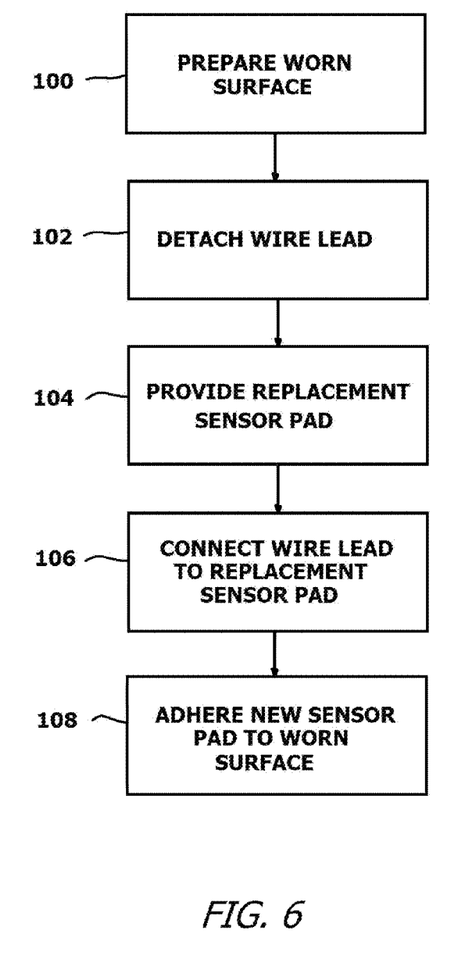
FIG. 6 is a block diagram outlining a method of installing the sensor array system.

Referring to FIG. 6 in conjunction with all previous figures, it will be understood that to utilize the present invention sensor array system 10, the existing worn foot contact surface 12 of a motorized board 10 is prepared by being either removed or cleaned. See Block 100. The existing sensors are also detached from the existing wire leads. See Block 102. This leaves a clean, but uneven support surface. A new sensor array system 20 is obtained. See Block 104. The wire leads 16 are connected to the new sensor array system 20. See Block 106. The adhesive 28 on the new sensor array system 20 is exposed and the sensor array system 10 is adhered to the support surface 14. See Block 108. Since the laminated construct 22 is divided into eight sensor fields 42 and each of the sensor fields 42 is only attached to the overall laminated construct 22 by one or two narrow lead fields 46, it is possible to apply the various sensor fields to a contoured support surface 14 without causing adverse stresses. Rather, the bending stresses are concentrated in the thin lead fields 46 where the stresses do not cause any false signals. Furthermore, the numerous slots 50 in the laminated construct 22 enable the lead fields 46 and the neutral fields 44 to flex without causing buckles. This prevents any pinching or folds in the laminate construct 22 that can hinder its operation.

It will be understood that the embodiment of the present invention that is illustrated and described is merely exemplary and that a person skilled in the art can make many variations to that embodiment. For instance, the length, width, and peripheral shape of the laminate construct can be changed to facilitate different motorized boards of different makes and models. All such embodiments are intended to be included within the scope of the present invention as defined by the claims.

What is claimed is:

1. A method of replacing a worn foot sensor array on a motorized board, comprising:
   removing said worn foot sensor array to expose a support surface on said motorized board;
   providing a replacement sensor array, wherein said replacement sensor array has multiple sensor fields that are separated by slots in said replacement sensor array, wherein said multiple sensor fields are only interconnected by narrow lead fields;
   electrically interconnecting said replacement sensor array to said motorized board; and
   affixing said replacement sensor array to said support surface.

2. The method according to claim 1, wherein providing a replacement sensor array includes providing a said replacement sensor array where said multiple sensor fields are disposed symmetrically about a midline.

3. The method according to claim 2, wherein an open area is disposed in said replacement sensor array along said midline.

4. The method according to claim 3, wherein providing a replacement sensor array includes providing said replacement sensor array with a first edge and a central slot that extends from said first edge to said open area.

5. The method according to claim 3, wherein providing a replacement sensor array includes providing said replacement sensor array with diagonal slots that extend from said open area to said first edge.

6. The method according to claim 5, wherein said multiple sensor fields include triangular sensor fields that are disposed between said diagonal slots and said first edge.

7. The method according to claim 5, wherein providing a replacement sensor array includes providing said replacement sensor array with parallel slots that extend from said diagonal slots, wherein said parallel slots are perpendicular to said first edge.

8. The method according to claim 7, wherein said multiple sensor fields include inner sensor fields that are disposed between said parallel slots and said midline.

9. The method according to claim 5, wherein said multiple sensor fields include outer sensor fields that are disposed between said diagonal slots and said parallel slots.

10. The method according to claim 1, wherein providing a replacement sensor array includes providing said replacement sensor array with an electrical connector disposed along said midline.

11. The method according to claim 10, wherein electrically interconnecting said replacement sensor array to said motorized board includes connecting said electrical connector to said motorized board.

12. The method according to claim 1, wherein affixing said replacement sensor array to said support surface includes adhesively affixing said replacement sensor array to said support surface.

13. A replacement sensor array system, comprising:
    a laminate structure having a first edge and multiple sensor fields, wherein said multiple sensor fields are disposed symmetrically about a midline;
    an open area disposed in said laminate structure along said midline;
    a central slot that extends from said first edge to said open area;
    diagonal slots that extend from said open area to said first edge;
    parallel slots that extend from said diagonal slots, wherein said parallel slots are perpendicular to said first edge;
    wherein said open area, said central slot, said diagonal slots and said parallel slots partially separate said multiple sensor fields.

14. The system according to claim 13, wherein said multiple sensor fields include triangular sensor fields that are disposed between said diagonal slots and said first edge.

15. The system according to claim 14, wherein said multiple sensor fields include outer sensor fields that are disposed between said diagonal slots and said parallel slots.

16. The system according to claim 15, wherein said multiple sensor fields include inner sensor fields that are disposed between said parallel slots and said midline.

17. The system according to claim 16, wherein said triangular sensor fields, said outer sensor fields and said inner sensor fields are all symmetrically disposed about said midline.

18. The system according to claim 13, further including lead fields that interconnect said multiple sensor fields.

19. The system according to claim 13, further including an electrical connector disposed on said midline.

* * * * *